(12) United States Patent
Yang

(10) Patent No.: US 6,345,610 B1
(45) Date of Patent: Feb. 12, 2002

(54) PARTIAL OXIDATION DEVICE FOR AN HCCI ENGINE INTAKE SYSTEM

(75) Inventor: Jialin Yang, Canton, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/579,813

(22) Filed: May 26, 2000

(51) Int. Cl.$^7$ ................................................. F23D 11/44
(52) U.S. Cl. ........................ 123/551; 123/536; 123/538
(58) Field of Search .................... 123/551, 3, 304, 123/536, 538

(56) References Cited

U.S. PATENT DOCUMENTS

| | | | |
|---|---|---|---|
| 2,915,377 A | * 12/1959 | Reichhelm | 123/551 |
| 3,949,723 A | * 4/1976 | Beesch | 123/551 |
| 4,047,511 A | * 9/1977 | Takagi | 123/551 |
| 4,074,661 A | * 2/1978 | Noguchi et al. | 123/551 |
| 4,120,273 A | * 10/1978 | Krause et al. | 123/551 |
| 4,131,086 A | * 12/1978 | Noguchi et al. | 123/551 |
| 4,404,931 A | * 9/1983 | Smith et al. | 123/551 |
| 4,625,910 A | * 12/1986 | Kawamura | 123/551 |
| 4,651,703 A | * 3/1987 | Hoppie | 123/551 |
| 4,684,341 A | * 8/1987 | Kawamura et al. | 123/551 |
| 4,691,682 A | * 9/1987 | Hoppie | 123/551 |
| 4,744,747 A | * 5/1988 | Kawamura et al. | 123/551 |
| 6,053,144 A | * 4/2000 | Greenwood et al. | 123/551 |

* cited by examiner

Primary Examiner—Marguerite McMahon
Assistant Examiner—Jason Benton
(74) Attorney, Agent, or Firm—Jerome R. Druoillard

(57) ABSTRACT

A homogeneous charge compression ignition engine comprising an air intake passage, a combustion chamber connected to the air intake passage, and a partial oxidation device is disclosed. The partial oxidation device comprises a housing including a fuel inlet, an air inlet, an outlet, a mixing chamber and a burning chamber. The air inlet is connected to the air intake passage and the outlet is also connected to the air intake passage. A source of ignition is attached to the housing for causing ignition of a portion of a fuel-air mixture supplied to the housing. A partially oxidized fuel is produced as the combusting fuel-air mixture is rapidly quenched upon exiting the outlet of the housing and entering the air intake passage. Different structures for achieving rapid quenching are discussed and different air supply strategies are also presented. Further, another structure for producing a partially oxidized fuel using a low temperature chain propagating reaction is included. This structure comprises a glow plug or heat pipe disposed in the air intake passage for heating the fuel and causing it to react without complete combustion prior to entering the combustion chamber.

20 Claims, 2 Drawing Sheets

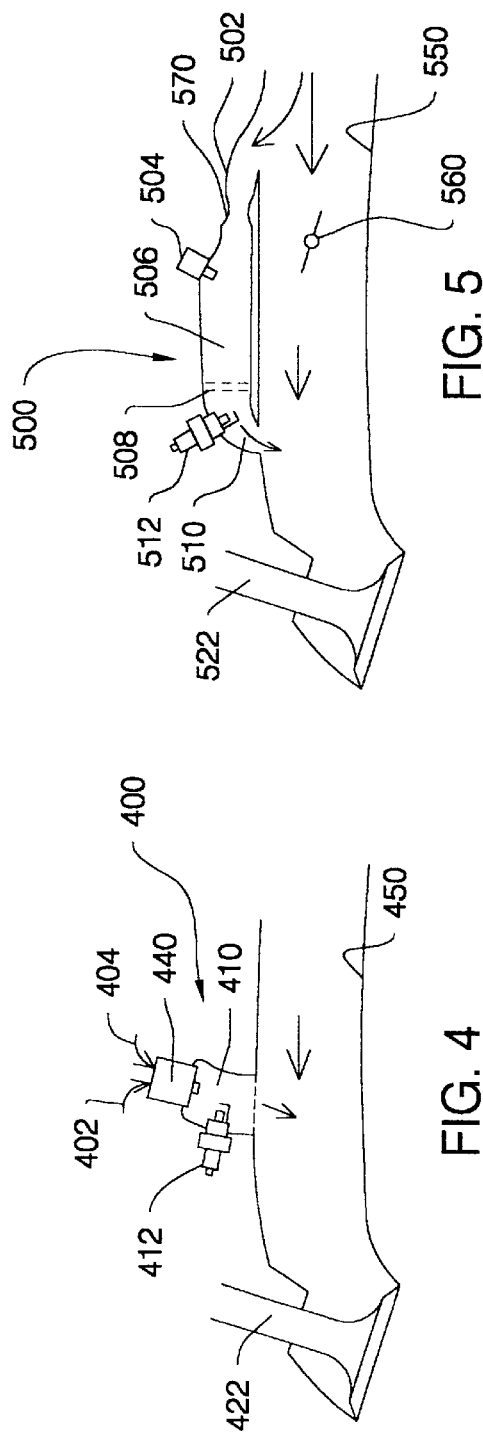

PARTIAL OXIDATION DEVICE FOR AN HCCI ENGINE INTAKE SYSTEM

BACKGROUND OF THE INVENTION

1. Field of the Invention

This invention relates to a structure for partially oxidizing fuel in an intake system of a homogeneous-charge compression-ignition (HCCI) engine.

2. Discussion of the Related Art

The homogeneous-charge compression-ignition engine is a relatively new type of engine. It has certain benefits that are attractive such as extremely low $NO_x$ emissions due to the low combustion temperatures of the diluted mixture and zero soot emissions due to the premixed lean mixture. Also, thermal efficiency of the HCCI engine is much higher than SI engines and is comparable to conventional CI engines due to the high compression ratio (similar to diesel engines), un-throttled operation (minimizing engine pumping losses), high air fuel ratio (high specific heat ratio), reduced radiation heat transfer loss (without sooting flame), and the low cycle-by-cycle variation of HCCI combustion (since the early flame development and the combustion rate of the HCCI engine does not rely on in-cylinder flow and turbulence).

The difficulty with combustion in an HCCI engine is controlling the ignition timing and the combustion rate at different operating conditions. This is because combustion starts by auto-ignition when the mixture reaches a certain temperature. Thus, the fuel-air mixture is formed much earlier before top dead center (TDC), and ignition can occur at any time during the compression process. Thus as the engine load increases, the ignition tends to advance, and the combustion rate tends to increase due to the richer mixture. The thermal efficiency may also decrease due to early heat release before TDC, and the engine becomes rough due to fast and early combustion.

When the engine load decreases, ignition tends to be retarded which may eventually result in misfire as well as an increase in HC and CO emissions. When engine speed increases, the time for the main heat release tends to be retarded since the time available for low-temperature preliminary reaction of the diluted mixture becomes insufficient and misfiring may occur.

SUMMARY OF THE INVENTION

An object of this invention is to provide a device that assists in controlling the ignition timing and the combustion rate at different operating conditions in an HCCI engine.

It is a further object of the invention to provide a device in an intake system of an HCCI engine that can partially oxidize fuel prior to entering a combustion chamber.

It is yet another object of the present invention to provide an intake system of an HCCI engine with a device that can allow controllable combustion with slow burning and fast quenching.

It is still a further object of the present invention to provide a method of producing partially oxidized fuel through a low-temperature chain propagating reaction prior to entering the combustion chamber of an HCCI engine.

It is another object of the present invention to provide a device and method for partially oxidizing fuel to promote autoignition in HCCI combustion so as to expand the range of HCCI combustion during light load, high speed and engine cold start.

The above objects are achieved, and the prior approaches are overcome by an oxidation device for partially combusting a quantity of fuel prior to a combustion chamber in a homogeneous charge compression ignition engine. The device comprises a housing including a fuel inlet, an air inlet and an outlet; a source of ignition attached to the housing for causing ignition of a portion of a fuel-air mixture supplied to the housing; and rapid quenching means for quickly extinguishing a combustion flame in the fuel-air mixture following ignition.

The objects of the invention are also accomplished by a homogeneous charge compression ignition engine comprising an air intake passage; a combustion chamber connected to the air intake passage; a fuel inlet for providing fuel to be partially oxidized prior to entering the combustion chamber, the fuel inlet being disposed in said air intake passage; and a glow plug disposed in the air intake passage for heating the fuel and causing it to react without complete combustion prior to entering the combustion chamber.

The objects of the invention are also accomplished by a homogeneous charge compression ignition engine comprising an air intake passage, a combustion chamber connected to the air intake passage, and a partial oxidation device. The partial oxidation device comprises a housing including a fuel inlet, an air inlet, an outlet, a mixing chamber and a burning chamber. The air inlet is connected to the air intake passage and the outlet is also connected to the air intake passage. A source of ignition is attached to the housing for causing ignition of a portion of a fuel-air mixture supplied to the housing. A partially oxidized fuel is produced as the combusting fuel-air mixture is rapidly quenched upon exiting the outlet of the housing and entering the air intake passage.

With these structures, it is possible to promote autoignition of HCCI combustion. This allows the range of HCCI combustion at light loads, high speeds and during engine cold start to be expanded.

BRIEF DESCRIPTION OF THE DRAWINGS

The above and other objects and features of the present invention will be clearly understood from the following description with respect to a preferred embodiments thereof when considered in conjunction with the accompanying drawings, wherein the same reference numerals have been used to denote the same or similar parts or elements, and in which:

FIG. 4 is a detailed schematic view of another type of partial oxidation device according to the present invention.

FIG. 5 is a detailed schematic view of yet another type of partial oxidation device according to the present invention.

FIG. 6 is a detailed schematic view of a partial oxidation device using a low temperature chain propagating reaction according to the present invention.

FIG. 7 is a detailed schematic view of a partial oxidation device using modified structure to achieve a low temperature chain propagating reaction according to the present invention.

DETAILED DESCRIPTION OF THE PREFERRED EMBODIMENTS

Figure 1:
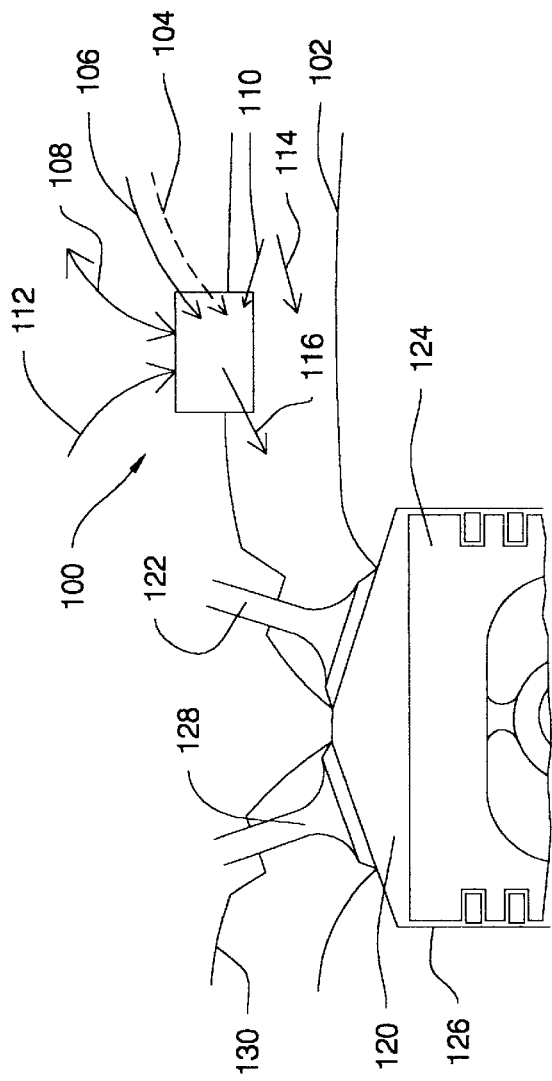
FIG. 1 is a schematic cross sectional view of an intake system including a partial oxidation device according to the present invention.

FIG. 1 is a schematic illustration showing a partial oxidation device 100 in an air intake passage 102. Generally, an air and fuel mixture can be fed to the device 100 through respective inlets 104 and 106. The device 100 can also include a connection for various sensors that can communicate with a control unit (not shown) via a control signal 108. Additional air can also be supplied to the device 100 through another inlet shown generally as 110.

An electric power inlet 112 is also attached to the device 100 for supplying electric power to operate a source of ignition for combusting the air-fuel mixture supplied to the partial oxidation device. The sources of ignition can include a spark plug, a glow plug or other types of igniters well known in the art. The fuel supply component can be a fuel injector, a carburetor or other types of fuel supply components well known in the art.

The purpose of the partial oxidation device is to produce partially oxidized fuel including components such as $C_2H_4$, $C_3H_6$, $CH_3CHO$, $C_4H_8$, HCHO, $CH_3OH$, as well as intermediate species/radicals, such as $H_2O_2$, $HO_2$, and CHO. When these partially oxidized radicals mix with the intake air and enter the cylinder (some radicals may survive at that time), they will promote autoignition during the compression stroke.

To accomplish combustion in the combustion chamber 120, air is fed via air intake 102 as shown by arrow 114. The gaseous products produced by the partial oxidation device 100 may also supplement this air as shown by arrow 116. This mixture then passes the intake valve 122 and proceeds into the combustion chamber 120. Fuel may also be added to the combustion chamber 120 by any well known method such as a fuel injector (not shown). The combustion chamber 120 is disposed above the piston 124 and is defined by a cylinder wall 126. After the exhaust valve 128 is opened, the combustion gases are removed via an exhaust port 130.

Two main ways are contemplated for producing partially oxidized fuel. The first way is shown generally by FIGS. 2–5. This technique uses a controllable combustion process with slow burning of the mixture and fast quenching. The combustion rate may be reduced by either making the equivalence ratio of the mixture much leaner or much richer than the stoichiometric proportion (for example, either $\phi<0.8$ or $\phi>1.35$ for gasoline-air mixtures).

Figure 2:
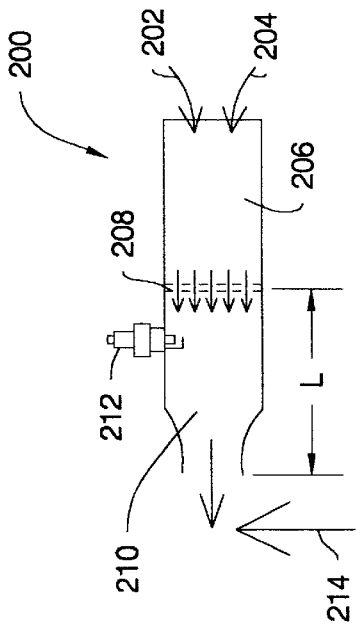
FIG. 2 is a detailed schematic view of one type of partial oxidation device according to the present invention.

Fast quenching of the combustion process can be realized by either quick dilution or wall quenching. FIG. 2 shows a partial oxidation device 200 where fuel is supplied as shown by arrow 202 and air is supplied as shown by arrow 204 to a mixing chamber 206. The air fuel mixture flows through a metal screen 208. The metal screen 208 can also be a plate containing small holes or porous materials. After passing the metal screen 208, the mixture enters a burning or combustion chamber 210 and is ignited by a source of ignition such as a spark plug 212.

The length L of the burning chamber 210 determines the traveling time for the gases to flow through the burning chamber 210. To obtain partially oxidized fuel, the length L should be shorter than the free flame length otherwise there would be no quenching. Depending on particular gas flow velocities and air fuel ratios, different lengths L result in different degrees of oxidation of the mixture and different reaction products. Also, the width of the burning chamber diameter D should be large enough for the mixture to be ignited. It is suggested that the measurement of the width D should be at least approximately 8 mm. However, it is also contemplated that the size of the combustion chamber can be controlled to be smaller than this size for controlling the rapid quenching by quickly extinguishing the flame prior to complete combustion. Therefore, it should be appreciated that the length L and the width D can be dimensioned accordingly to achieve this objective.

FIG. 2 shows that the burning mixture is quenched by fresh air as shown by arrow 214. This fresh air can be the air in the air intake 102 as the burning mixture is returned to the main air intake passage or it can may even be air supplied to an additional passage (not shown) before the partially combusted products are returned to the main air intake.

Figure 3:
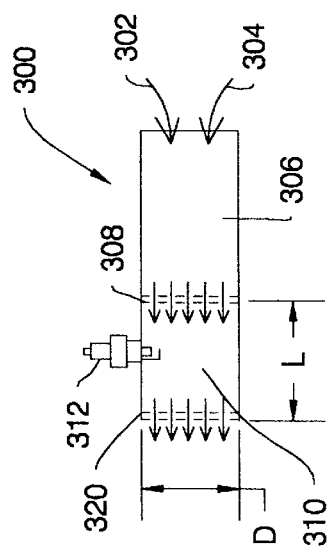
FIG. 3 is a detailed schematic view of a further type of partial oxidation device according to the present invention.

FIG. 3 shows a partial oxidation device 300 similar to the device 200 in FIG. 2 and similar reference numerals have been used and designated by the 300 series for this partial oxidation device. The main difference in FIG. 3 is that the burning mixture is quenched by passing a metal screen 320. The metal screen 320 may also be holes in a plate or even a porous material such as a ceramic material.

FIGS. 4 and 5 illustrate two different air supply strategies for providing air to the partial oxidation devices. Similar reference numerals have been used and designated by the 400 and 500 series for these partial oxidation devices.

FIG. 4 illustrates a partial oxidation device 400 where fuel is supplied via inlet 402 and air is supplied via inlet 404 to a burner 440. The air supplied to inlet 404 can be external compressed air supplied in a manner known in the art. The air and fuel are mixed in the burner and are ignited by the spark plug 412 in the burning chamber 410.

FIG. 5 illustrates the second air supply strategy where air is supplied from the air intake passage 550 through inlet 502. It is also possible to provide a metering restriction 570 in the passage before the air enters the main mixing chamber 506. In the mixing chamber 506, the air is mixed with fuel provided for example by a fuel injector 504. The mixture passes through screen 508 and is ignited in the burning chamber 510 by igniter 512. The combustion is then rapidly quenched by its reentry into the main intake passage 550 prior to passing intake valve 522. It is also possible to vary the rate of the air supplied to inlet 502 based on engine conditions by using a throttle 560.

FIGS. 6 and 7 illustrate another way to produce partially oxidized fuel through a low temperature chain propagating reaction. As shown in FIG. 6, a fuel spray provided by a fuel supply device 660, such as a fuel injector, impinges on a glow plug 662. The glow plug is operated at a temperature just below the fuel thermal decomposition temperature (approximately 1000K. for gasoline) by a temperature control unit 664. In a gasoline fueled HCCI engine, the glow plug temperature is maintained at approximately 850–950K. The fuel air mixture near the glow plug surface is heated by fuel impingement on and heat transfer with the glow plug 662. The fuel supply device 660 and the glow plug 662 are disposed in the main air intake 668 in this embodiment and the partially oxidized fuel and radicals and main air supply all pass by intake valve 672 before entering the combustion chamber (not shown).

FIG. 7 shows a similar arrangement with similar reference numerals beginning with the 700 series. The main difference is that in FIG. 7, a recess 790 is provided around the glow plug 762 so as to help the heated mixture to stay near the plug for a longer time so that the low temperature reaction has additional time to occur.

It is also possible to substitute the glow plug with the end of a variable conductance heat pipe that can also interpreted as reference numerals 662 and 762 in FIGS. 6 and 7. The hot end of the heat pipe can then heat up the fuel and cause the fuel to become heated. It is also possible to supply heat to the heat pipe by using the exhaust gases produced by the engine.

The low temperature chain propagating reaction of the mixture starts even below 750K. This low temperature reaction produces partially oxidized fuel and intermediate species/radicals. As can be seen, no chamber for the partial oxidation process is needed and the injector and glow plug may be mounted directly on the intake port walls. Although, if desired, the fuel inlet and the glow plug or the end of the heat pipe may be disposed in a separate partial oxidation device such as is shown in FIG. 5.

Some specific engine conditions are especially useful for promoting autoignition of HCCI combustion by partially oxidized fuel. These conditions include a light engine load, at high engine speed and during engine cold start. Therefore, it is anticipated that an HCCI engine equipped with a partial oxidation device can have different fuel injection strategies for HCCI combustion. These include:

1) At medium or high loads and at low engine speed, no fuel is injected in the partial oxidation device. All of the fuel is injected through an in-cylinder injector or port injector or provided by a carburetor.

2) At light engine loads, high engine speeds or during engine cold starts, a portion of the fuel is injected in the partial oxidation device while the remaining fuel is injected in the cylinder or in the intake port.

3) At light loads or during engine cold start, all fuel is injected in the partial oxidation device.

This concept can be used in both gasoline-fueled and diesel-fueled HCCI engines. One partial oxidation device can be applied for each engine. Alternatively, one device can be used for each cylinder. Further, although the injector in the partial oxidation device is considered to be an extra injector, it may also be used to inject all the fuel to a cylinder or for the whole engine and thus it can act as a PFI injector or a throttle body injector, respectively.

With this structure and arrangement, it is possible to promote autoignition of HCCI combustion. This allows the range of HCCI combustion at light loads, high speeds and during engine cold start to be expanded.

It should also be appreciated that the partial oxidation devices and structures of providing partially oxidized fuel also can be used in hybrid engines including HCCI strategies and other combustion strategies such as spark ignition. Therefore, as disclosed throughout this specification and claims, the term "homogeneous charge compression ignition engine" should be interpreted as including both engines with HCCI strategies as well as those using HCCI strategies in combination with other combustion strategies (hybrid engines).

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. An oxidation device for partially combusting a quantity of fuel prior to a combustion chamber in a homogeneous charge compression ignition engine, comprising:
   a housing including a fuel inlet, an air inlet and an outlet;
   a source of ignition attached to said housing for causing ignition of a portion of a fuel-air mixture supplied to said housing; and
   during light load running operation of the homogeneous charge compression ignition engine rapid quenching means for quickly extinguishing a combustion flame in the fuel-air mixture following ignition.

2. An oxidation device as defined in claim 1, wherein said housing includes a mixing chamber and a burning chamber.

3. An oxidation device as defined in claim 1, wherein said rapid quenching means includes a connection for passing a partially combusted mixture after ignition into an additional air source.

4. An oxidation device as defined in claim 1, wherein said rapid quenching means includes a plate containing openings therein which stop the combustion process from completing.

5. An oxidation device as defined in claim 4, wherein said plate is a metal screen disposed in the vicinity of said outlet of said housing.

6. An oxidation device as defined in claim 4, wherein said plate is a porous material.

7. An oxidation device as defined in claim 1, wherein said housing includes a burner including said fuel inlet and said air inlet.

8. An oxidation device as defined in claim 1, wherein said air inlet in said housing is adapted to be connected to an air intake passage of a homogeneous charge compression ignition engine.

9. An oxidation device as defined in claim 1, wherein said source of ignition is a spark plug.

10. An oxidation device as defined in claim 1, wherein said housing includes a first attachment for connecting said air inlet to an air intake passage of a homogeneous charge compression ignition engine and a second attachment for connecting said outlet to the air intake passage of the engine downstream of said air inlet for said housing.

11. A homogeneous charge compression ignition engine comprising:
    an air intake passage;
    a combustion chamber connected to said air intake passage;
    a fuel inlet for providing fuel to be partially oxidized prior to entering the combustion chamber, said fuel inlet being disposed in said air intake passage; and
    a heat source disposed in said air intake passage for heating the fuel and causing it to react without complete combustion prior to entering the combustion chamber.

12. A homogeneous charge compression ignition engine as defined in claim 11, wherein said heat source includes a glow plug and said engine further comprises a temperature control unit for maintaining the glow plug at a predetermined temperature.

13. A homogeneous charge compression ignition engine as defined in claim 11, wherein said air intake passage includes a recess disposed in the vicinity of said heat source.

14. A homogeneous charge compression ignition engine as defined in claim 11, wherein said fuel inlet is disposed in a fuel injector that directs fuel toward said heat source.

15. A homogeneous charge compression ignition engine as defined in claim 11, wherein said heat source comprises a glow plug and said fuel inlet is disposed in said air intake passage opposite from said glow plug so that fuel directed toward said glow plug.

16. A homogeneous charge compression ignition engine comprising:
    an air intake passage;
    a combustion chamber connected to said air intake passage;
    a partial oxidation device comprising a housing including a fuel inlet, an air inlet, an outlet, a mixing chamber and a burning chamber, said air inlet being connected to said air intake passage and said outlet being connected to said air intake passage; and a source of ignition attached to said housing for causing ignition of a portion of a fuel-air mixture supplied to said housing in said mixing chamber by said fuel inlet and said air inlet, said source of ignition being disposed in said burning chamber, whereby a partially oxidized fuel is produced as the combusting fuel-air mixture is rapidly quenched upon exiting said outlet of said housing and entering said air intake passage.

17. A homogeneous charge compression ignition engine as defined in claim 16, further comprising a throttle valve disposed in said air intake passage for regulating air flow to said air inlet of said housing.

18. A homogeneous charge compression ignition engine as defined in claim 16, further comprising a plate including openings therein, said plate being disposed in said housing.

19. A homogeneous charge compression ignition engine as defined in claim 18, wherein said plate is disposed in said housing adjacent said outlet.

20. A homogeneous charge compression ignition engine as defined in claim 18, wherein said plate is disposed in said housing between said mixing chamber and said burning chamber.

* * * * *